(12) United States Patent
Wrona et al.

(10) Patent No.: US 9,638,305 B2
(45) Date of Patent: May 2, 2017

(54) DIFFERENTIAL ASSEMBLY FOR VEHICLES

(71) Applicant: Mana Industries, Inc., Fairport, NY (US)

(72) Inventors: Matthew Robert Wrona, Fairport, NY (US); Qin Xu, West Henrietta, NY (US)

(73) Assignee: MANA INDUSTRIES, INC., Fairport, NY (US)

( * ) Notice: Subject to any disclaimer, the term of this patent is extended or adjusted under 35 U.S.C. 154(b) by 36 days.

(21) Appl. No.: 14/774,765

(22) PCT Filed: Mar. 12, 2014

(86) PCT No.: PCT/US2014/023993
§ 371 (c)(1),
(2) Date: Sep. 11, 2015

(87) PCT Pub. No.: WO2014/164977
PCT Pub. Date: Oct. 9, 2014

(65) Prior Publication Data
US 2016/0025201 A1 Jan. 28, 2016

Related U.S. Application Data

(60) Provisional application No. 61/778,434, filed on Mar. 13, 2013.

(51) Int. Cl.
*F16H 48/08* (2006.01)
*F16H 48/22* (2006.01)
(Continued)

(52) U.S. Cl.
CPC ............. *F16H 48/22* (2013.01); *F16H 48/08* (2013.01); *F16H 48/28* (2013.01); *F16H 48/40* (2013.01); *F16H 2048/207* (2013.01)

(58) Field of Classification Search
CPC .......... F16H 48/06; F16H 48/08; F16H 48/20; F16H 48/22; F16H 48/28
See application file for complete search history.

(56) References Cited

U.S. PATENT DOCUMENTS 2,859,641 A 11/1958 Gleasman
3,331,262 A 7/1967 Mazziotti
(Continued)

FOREIGN PATENT DOCUMENTS

GB 1137659 12/1968

OTHER PUBLICATIONS

International Search Report and Written Opinion for PCT/US2014/023993, mailing date Jul. 10, 2014.

*Primary Examiner* — Jacob S Scott
(74) *Attorney, Agent, or Firm* — Brown & Michaels, PC (57) ABSTRACT

A differential assembly includes a differential housing, two side gears, at least one output hub, and at least one pinion gear assembly. When a torque input is provided to the first side gear, eccentric contact surfaces on the first side gear and the output hub contact under compression forces, and compression forces between the outer cylindrical surface of the first side gear and an inner cylindrical surface of the differential housing and between the outer cylindrical surface of the first output hub and the inner cylindrical surface of the differential housing cause frictional forces between the differential housing and the first side gear and between the differential housing and the first output hub to provide a torque bias to the differential assembly. In some embodiments, the differential housing includes a second output hub and eccentric contact surfaces on the second side gear and the second output hub.

16 Claims, 7 Drawing Sheets

(51) Int. Cl.
   *F16H 48/28* (2012.01)
   *F16H 48/40* (2012.01)
   F16H 48/20 (2012.01)

(56) References Cited

U.S. PATENT DOCUMENTS

| | | |
|---|---|---|
| 3,706,239 A | 12/1972 | Myers |
| 3,853,022 A | 12/1974 | Duer |
| 4,513,635 A | 4/1985 | Takimura et al. |
| 5,098,356 A | 3/1992 | Guidoni et al. |
| 5,161,658 A | 11/1992 | Hagiwara |
| 5,215,506 A | 6/1993 | Hara |
| 5,362,284 A | 11/1994 | Brewer |
| 5,989,147 A | 11/1999 | Forrest et al. |
| 6,544,137 B2 | 4/2003 | Duan |
| 7,270,026 B2 | 9/2007 | Atkinson et al. |
| 8,287,418 B2 | 10/2012 | McVea et al. |
| 2004/0149062 A1 | 8/2004 | Atkinson et al. |

DIFFERENTIAL ASSEMBLY FOR VEHICLES

REFERENCE TO RELATED APPLICATIONS

This application claims one or more inventions which were disclosed in Provisional Application No. 61/778,434, filed Mar. 13, 2013, entitled "DIFFERENTIAL ASSEMBLY FOR VEHICLES". The benefit under 35 USC §119(e) of the United States provisional application is hereby claimed, and the aforementioned application is hereby incorporated herein by reference.

BACKGROUND OF THE INVENTION

Field of the Invention

The invention pertains to the field of vehicle differential assemblies. More particularly, the invention pertains to a limited slip torque sensitive differential assembly.

Description of Related Art

A differential is a device, usually, but not necessarily, employing gears, capable of transmitting torque and rotation through three shafts, typically used in one of two ways. In one way, the differential receives one input and provides two outputs and in the other way, the differential combines two inputs to create an output that is the sum, difference, or average, of the inputs.

In automobiles and other wheeled vehicles, the term often applies to a "traditional" rear-wheel-drive car or truck with an "open" or limited slip differential, where the differential allows each of the driving wheels to rotate at different speeds.

Thus, for example, if a car is making a turn to the right, the left wheel will make more rotations because it has further to travel, and the right wheel will make fewer rotations, as it has less distance to travel. For example, the left wheel makes 12 rotations, and the right wheel makes 8 rotations.

When the vehicle is traveling in a straight line, there is no differential movement of the planetary system of gears other than the minute movements necessary to compensate for certain factors, which may include, but are not limited to, slight differences in wheel diameter and undulations in the road that make for a longer or shorter wheel path.

Differentials are also used to distribute torque between wheels in front axle drive applications.

Differentials may also be used to distribute torque among multiple axles, such as center box applications.

An undesirable side effect of a conventional differential is that it can limit traction under less than ideal conditions. The amount of traction required to propel the vehicle at any given moment depends on one or more factors, which may include, but is not limited to, the load at that instant, how heavy the vehicle is, how much drag and friction there is, the gradient of the road, and the vehicle's momentum.

The torque applied to each driving wheel is a result of the engine, transmission, and drive axles applying a torque against the resistance of the traction at that wheel. In lower gears and thus at lower speeds, and unless the load is exceptionally high, the drive train can supply as much torque as necessary, so the limiting factor becomes the traction under each wheel. It is therefore convenient to define traction as the amount of torque that can be generated between the tire and the road surface before the wheel starts to slip. If the torque applied to drive wheels does not exceed the threshold of traction, the vehicle is propelled in the desired direction and if not, then one or more wheels simply slip relative to the road surface.

With an open differential, each tire is allowed to rotate at a different speed from the other as soon as a tire atop a slippery surface exceeds the threshold of traction available to it. Additionally, once the traction threshold is broken and the tire experiences slip, the traction available also decreases in accordance with the laws of kinetic friction. Since an open differential limits total torque applied to both drive wheels to the amount utilized by the lower traction wheel multiplied by a certain factor, when one wheel is on a slippery surface, the total torque applied to the driving wheels becomes lower than the minimum torque required for vehicle propulsion. Thus, the vehicle's propulsion becomes limited.

In an open differential, since the input torque is split into equal halves to the two outputs, the maximum torque available of the vehicle is limited by the wheel with the less traction torque; i.e., twice the traction torque of the wheel with the less traction torque.

One improvement to an open differential is the electronic traction control system. It usually uses an anti-lock braking system (ABS) wheel speed sensor to detect a spinning wheel and applies the brake to that wheel. This progressively raises the reaction torque at that wheel, and the differential compensates by transmitting more torque through the other wheel. However, this process happens in reaction to a slipping wheel and therefore it is considered reactive.

Another alternative improvement to an open differential is the limited slip differential. In a limited-slip type differential, the wheel with more traction torque is capable of transmitting more torque output than the other wheel with less traction torque; the maximum available torque difference between the two wheels is called the torque bias. This torque bias has to be overcome before one wheel slips. Thus, compared with the electronic traction control system, it is considered proactive.

The limited-slip type of differential generally has several types. One type has a relatively fixed torque bias between the two outputs. This type generally includes the components of an open differential as well as biasing elements. Typically a spring is used in this type between the two side gears, between the side gears and differential housing, or between the two spider gears to generate relatively constant friction, such as shown in U.S. Pat. No. 7,270,026. To magnify the available friction or frictional torque, a multi-disk clutch pack is generally used, which allows extra torque to be sent to a wheel with higher resistance than available at the other driven wheel, when the limit of friction is reached at that other wheel, such as shown in U.S. Pat. No. 3,331,262. One drawback of this type of differential is the constant wear at the frictional surfaces whenever there is relative sliding speed between them. This happens even when the vehicle makes a turn without needing significant power. Since this minimum frictional force is continually active to resist differentiation, the friction clutches tend to wear, resulting in a deterioration of intended differential performance. Another drawback is that since a minimum friction resistance must be overcome to allow any relative rotation between drive axles, there is a waste of energy. Still another drawback is that the available bias torque before one wheel slips is generally not very large, making the differential ineffective in torque demanding applications.

Another type of limited-slip differential has a relatively fixed ratio between the two torque outputs to the two wheels when they have different rotational speeds, which is called torque bias ratio. In this type, the available torque bias before one wheel slips is proportional to the input power or torque. Typically, a planet gearing system (either parallel axial such as shown in U.S. Pat. No. 3,706,239 or cross-axis helical such as shown in U.S. Pat. No. 2,859,641) is employed to link the two side gears so that the corresponding separation force and thrust force are generated against the housing. These separation and thrust forces cause the bias frictional torque to be generated. This frictional torque is generally proportional to the input torque or power, and thus the differential has a fixed torque bias ratio. The differential has no significant wear when the input power is close to zero, even when the two wheels have different rotational speeds, such as when the vehicle makes a turn without significant power. This type is also called a torque-sensitive limited slip differential. With more parts involved, the limited-slip differentials with fixed torque bias ratio are generally more complex and more difficult to manufacture, and therefore more expensive, than open differentials and multi-disk clutch type limited slip differentials. In addition, methods to retain axle shafts or axle retainers such as "C" clips are generally not compatible with the current torque-sensitive limited slip differentials. Generally, in order to upgrade to a torque-sensitive limited slip differential from an open differential, there is added cost to implement the axle retainer compatible features such as "C" clips, or the axle shafts have to be retained by other means.

Sometimes, in a more complicated differential, the features of the above two types (fixed torque bias and fixed torque bias ratio) are both used to obtain a more customized torque bias ratio or torque bias as a function of input power or input torque, as shown in U.S. Pat. No. 5,098,356, U.S. Pat. No. 5,362,284, and U.S. Pat. No. 8,287,418. The drawback is, of course, added complexity and cost.

There is still another type of differential called a speed sensitive limited slip differential. In this type, the torque bias is dependent upon the relative speed difference between the two wheels. When the speed difference is small, the torque bias is very small, almost similar to an open differential. When the speed difference is large, the torque bias is large. One example is the viscous type differential, as shown in U.S. Pat. No. 5,161,658. Viscous type differentials are typically less efficient than open differentials. For example, a viscous type differential loses or wastes some power during vehicle turning. Another drawback is that the viscous mechanism tends to deteriorate and the viscous differential behaves as a semi-open differential prior to the end of the vehicle's life expectancy. Other advanced speed sensitive limited slip differentials include Gerotor pump (as shown in U.S. Pat. No. 6,544,137) and electronic limited slip (such as in U.S. Pat. No. 5,215,506) differentials, in which the speed difference between the two wheels is sensed and a clamping force is actively generated in response, usually by hydraulics, to increase the torque bias between the two wheels. The drawback of these speed sensitive limited slip differentials is added complexity and cost.

Therefore, there is a need to reduce the cost and complexity of a limited slip differential.

SUMMARY OF THE INVENTION

A differential assembly includes a differential housing, two side gears, at least one output hub, and at least one pinion gear. When a torque input is provided to the first side gear, eccentric contact surfaces on the first side gear and the output hub contact under compression forces, and compression forces between the outer cylindrical surface of the first side gear and an inner cylindrical surface of the differential housing and between the outer cylindrical surface of the first output hub and the inner cylindrical surface of the differential housing cause frictional forces between the differential housing and the first side gear and between the differential housing and the first output hub to provide a torque bias to the differential assembly. In some embodiments, the differential housing includes a second output hub and eccentric contact surfaces on the second side gear and the second output hub.

In some embodiments, a differential assembly includes a differential housing, a first side gear, a first output hub, a second side gear, and at least one pinion gear assembly. The differential housing has a first rotation axis and has a first inner cylindrical surface substantially centered on the first rotation axis. The first side gear has a first side gear outer cylindrical surface mating with the first inner cylindrical surface of the differential housing and has a first eccentric first side gear contact surface and a second eccentric first side gear contact surface. The first output hub has a first output hub outer cylindrical surface mating with the first inner cylindrical surface of the differential housing, a first eccentric first output hub contact surface mating with the first eccentric first side gear contact surface of the first side gear, and a second eccentric first output hub contact surface mating with the second eccentric first side gear contact surface of the first side gear. The second side gear is rotatable substantially on the first rotation axis. The pinion gear assembly engages the first side gear and the second side gear. The pinion gear assembly includes at least one pinion gear. The first eccentric first side gear contact surface, the second eccentric first side gear contact surface, the first eccentric first output hub contact surface, and the second eccentric first output hub contact surface are formed such that a first input torque on the first side gear in a clockwise direction causes compression forces between the first eccentric first output hub contact surface and the first eccentric first side gear contact surface, between the first side gear outer cylindrical surface of the first side gear and the first inner cylindrical surface of the differential housing, and between the first output hub outer cylindrical surface of the first output hub and the first inner cylindrical surface of the differential housing, and a second input torque on the first side gear in a counterclockwise direction causes compression forces between the second eccentric first output hub contact surface and the second eccentric first side gear contact surface, between the first side gear outer cylindrical surface of the first side gear and the first inner cylindrical surface of the differential housing, and between the first output hub outer cylindrical surface of the first output hub and the first inner cylindrical surface of the differential housing.

In other embodiments, a method differentiates torque between a first shaft and a second shaft in a differential assembly. Compression forces are applied to the first inner cylindrical surface of the differential housing by contact with the first side gear outer cylindrical surface of the first side gear and the first output hub outer cylindrical surface of the first output hub based on an input torque applied to the first side gear causing compression forces between the first eccentric first side gear contact surface of the first side gear and the eccentric first output hub contact surface of the first output hub, thereby providing a torque bias between the first side gear and the second side gear.

Further scope of applicability of the present invention will become apparent from the following detailed description, claims, and drawings. However, it should be understood that the detailed description and specific examples of the invention are given by way of illustration only, since various changes and modifications within the spirit and scope of the invention will become apparent to those skilled in the art.

DETAILED DESCRIPTION OF THE INVENTION

In some embodiments, a limited slip differential assembly is simple and low cost to manufacture.

In some embodiments, a limited slip differential assembly is readily retrofitted into existing vehicular applications as well as incorporated into the manufacturing of new vehicular differential assemblies.

In some embodiments, a limited slip differential assembly is more durable than conventional limited slip differential assemblies.

In some embodiments, the torque bias ratio of a limited slip differential assembly is easily fine-tuned or customized.

In some embodiments, a differential is shown to behave as a limited-slip differential, more specifically, a limited-slip differential with a relatively constant torque bias ratio. Compared to an open differential, these embodiments have one side gear, which is modified, and the addition of an output hub. The side gear has one partial outer cylindrical surface, which mates with the inner cylindrical surface of the differential housing. The output hub has one partial outer cylindrical surface, which mates with the inner cylindrical surface of the differential housing. The output hub also has a contact feature that is in mating engagement with a corresponding contact feature on the side gear for one rotation direction. For the opposite rotation direction, the output hub has another contact feature that is in mating engagement with another corresponding contact feature on the side gear. The output hub delivers the torque to the corresponding axle shaft through its own spline. These embodiments generate torque bias due to frictional forces between the partial outer cylindrical surface of the output hub and the inner cylindrical surface of the differential housing and between the partial outer cylindrical surface of the side gear and the inner cylindrical surface of the differential housing. These frictional forces are caused by the torque generated compressive force between the contact feature of the output hub and the contact feature of the side gear.

In other embodiments, two side gears (of an open differential) are modified and two output hubs are added. Each side gear has one partial outer cylindrical surface, which mates with each of the inner cylindrical surfaces of the differential housing. Each output hub has one partial outer cylindrical surface, which mates with each of the inner cylindrical surfaces of the housing. Each output hub also has a contact feature that is in mating engagement with a corresponding contact feature on each side gear for one rotation direction. For the opposite rotation direction, each output hub also has another contact feature that is in mating engagement with another corresponding contact feature on each side gear. Each output hub delivers the torque to the corresponding axle shaft through its own spline. These embodiments generate torque bias due to frictional forces between each partial outer cylindrical surface of each output hub and each inner cylindrical surface of the differential housing and between each partial outer cylindrical surface of each side gear and each inner cylindrical surface of the differential housing. These frictional forces are caused by the torque-generated compressive forces between each contact feature of the output hub and each contact feature of the side gear, thus providing potentially more torque bias than the first embodiments.

Benefits of these embodiments may include, but are not limited to, a lower cost to manufacture due to a much lower part count compared to conventional limited slip differentials with a fixed torque bias ratio; an ease to retro-fit into a current open differential model without significant design changes, in particular, the option to have axle retainers such as "C" clips is thoroughly maintained, so there is no need to change either axial shaft designs; more durability due to a strong monolithic part, no fragile planetary gears, and the reduced Hertzian contact stress between the partial outer cylindrical surfaces of the output hub or the side gear and the inner cylindrical surface of the differential housing, which may potentially increase the life of the differential; and a different torque bias ratio that may be finely tuned and customized by changing certain design parameters, as shown later.

As described above, there is a need to provide differential action which can effectively provide torque to the driven wheels, when the driven wheels experience varying road surface conditions.

Figure 1:
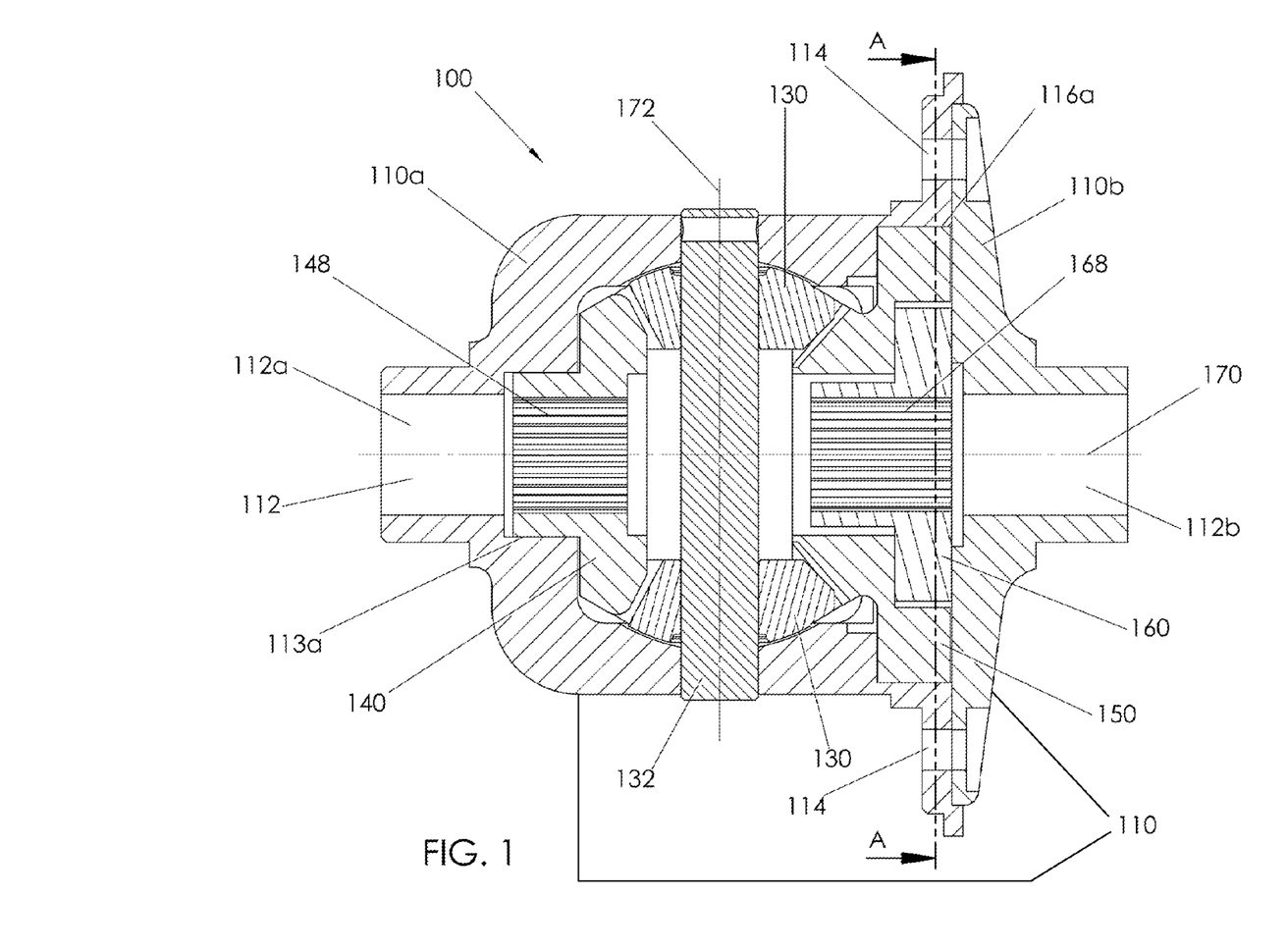
FIG. 1 is a cross-section view of a differential gear assembly in an embodiment of the present invention.
Figure 2:
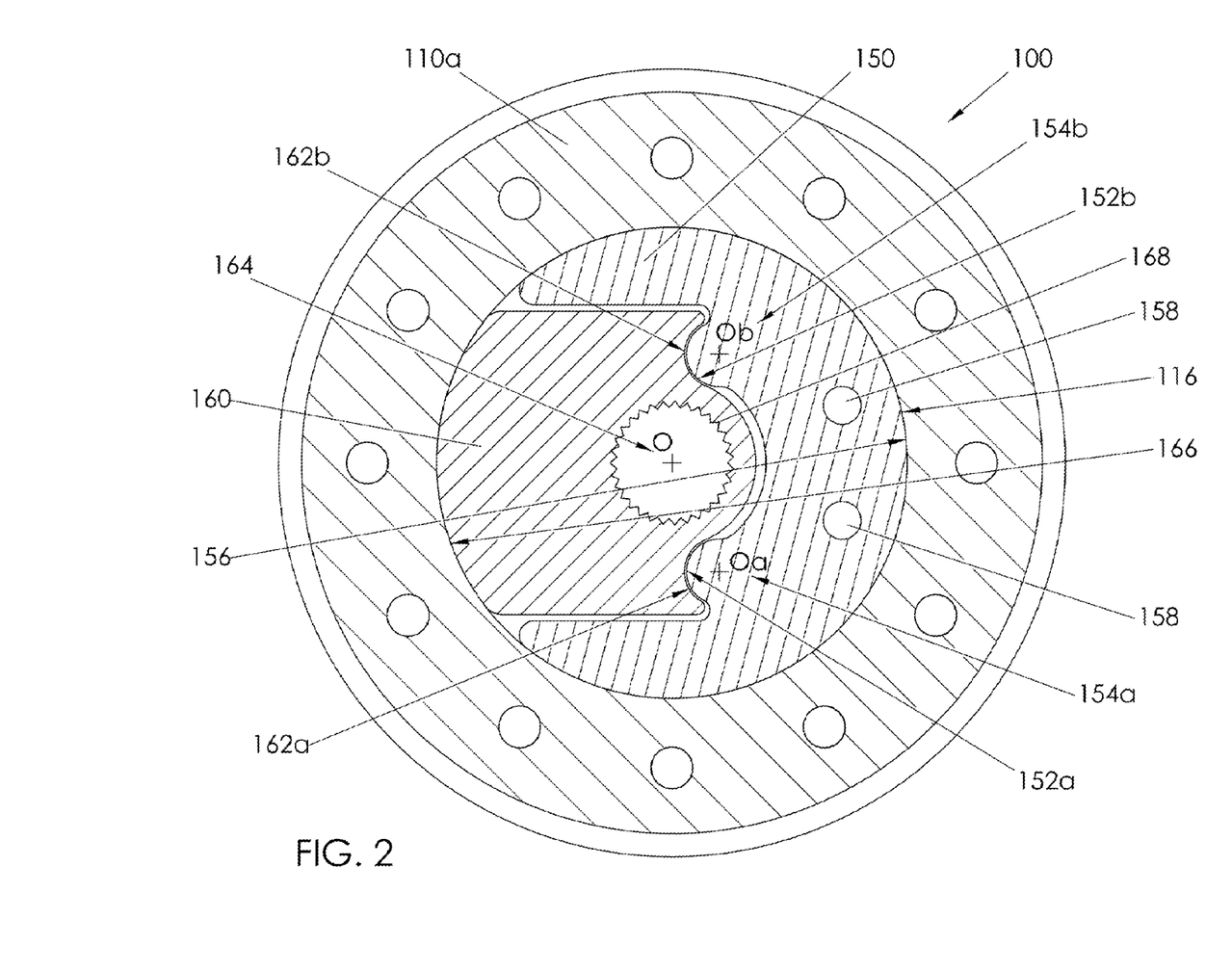
FIG. 2 is a cross-section view of the differential gear assembly of FIG. 1 taken along line A-A.
Figure 3:
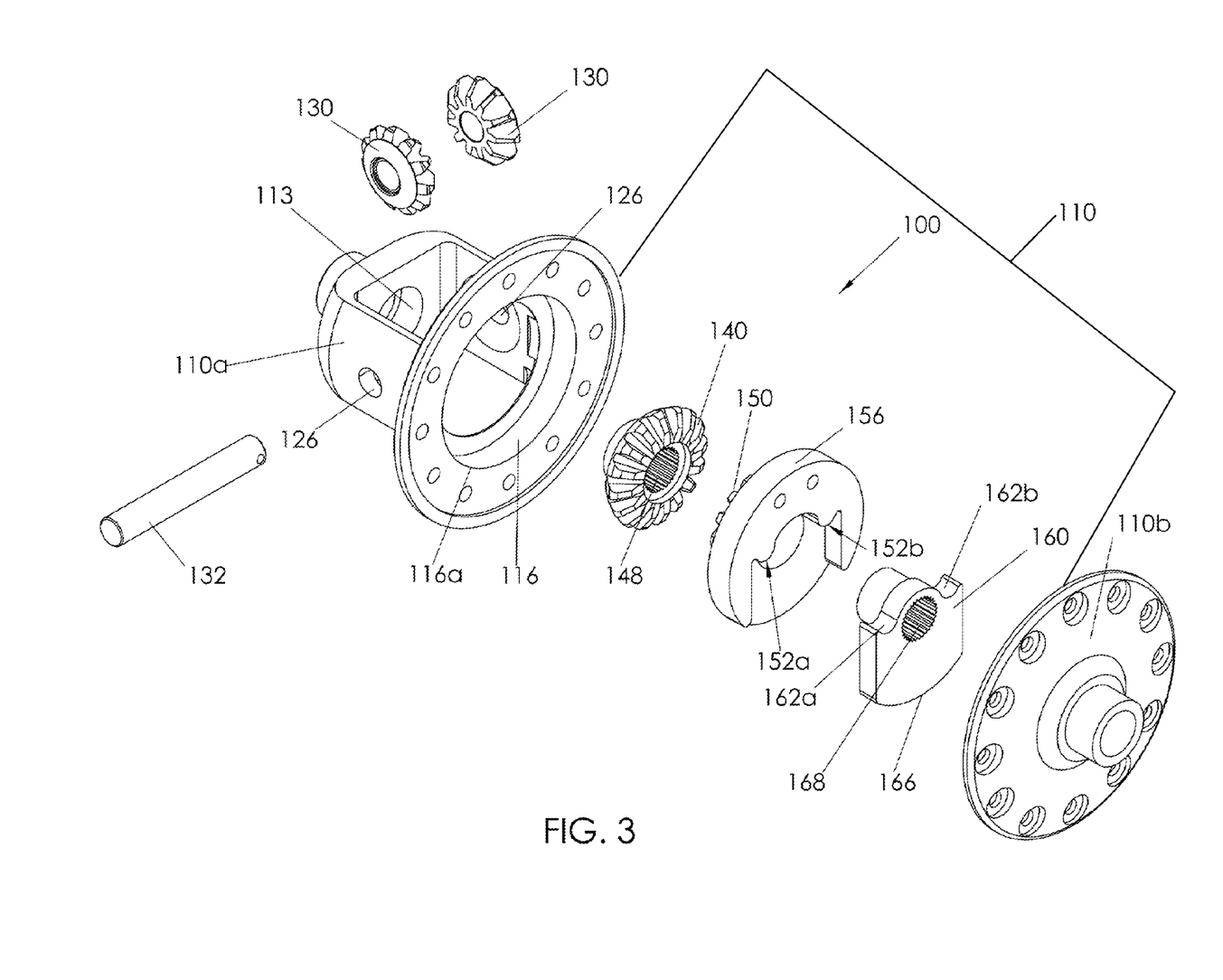
FIG. 3 is an exploded perspective view of the differential gear assembly of FIG. 1.

FIGS. 1-2 show a differential assembly 100 for use in a vehicle. FIG. 3 shows the same differential assembly in a disassembled state. The vehicle may be a front wheel drive type, a rear wheel drive type, a four wheel drive type, or a multi axle drive type. The differential assembly may be used in any or all of the vehicle's axles as well as between any or all axles, commonly referred to as "center box" applications. For simplicity, the following description describes the configuration and function of a differential assembly example used in a single axle driven application. However, the mechanism or the operation principle of the differential may be similarly inferred for each above stated applications.

FIGS. 1-2 illustrate a differential assembly 100 includes a housing 110 which includes a small end housing 110a and a cover end housing 110b. The small end housing 110a and cover end housing 110b are rigidly coupled to each other by bolts (not shown) at mounting holes 114. The actual coupling method can vary widely depending on the design of the housing 110.

In FIG. 1, the small end housing 110a and the cover end housing 110b together (or the housing 110) defines an inner cylindrical channel 112. Each end 112a, 112b of the channel 112 is shaped to receive a half shaft (not shown) to which a driven wheel of the vehicle is attached. The common axis defined by the inner cylindrical channels 112a, 112b defines the differential assembly axis 170. In addition, in FIGS. 1-3, the small end housing 110a and cover end housing 110b are together configured to house various members, including a first side gear 140, a second side gear 150, a pair of pinion gears 130, a shaft 132, and an output hub 160.

To some degree, the differential housing 110 is similar to most open differential cases. The differential housing 110 defines holes 126 (see FIG. 3) to receive and support the shaft 132 about which the pinion gears 130 rotate. The first side gear 140 is maintained within the housing 110 by a cylindrical recess 113 (concentric with the differential axis 170) of the small end housing 110a, so that the first side gear rotates about the differential axis 170. The cylindrical recess 113 has an inner cylindrical surface 113a.

The second side gear 150 has a partial outer cylindrical surface 156, so that the second side gear 150 is maintained within the housing 110 by a cylindrical recess 116a (concentric with the differential axis 170) of the small end housing 110a. The cylindrical recess 116a has an inner cylindrical surface 116. Thus, the second side gear can rotate about the differential axis 170.

The output hub 160 is maintained by both the second side gear 150 and the housing 110. The second side gear 150 has a contact feature 152a that mates with a contact feature 162a on the output hub 160 when driven in a first rotation direction. The second side gear 150 has a contact feature 152b that mates with a contact feature 162b on the output hub 160 when driven in the opposite driven rotation direction. These contact features (152a, 152b, 162a, and 162b) are substantially cylindrical in this embodiment, but other shapes are possible for these contact features. The contact feature 152a on the second side gear 150 and the contact feature 162a on the output hub 160 have substantially the same Oa axis 154a, while the contact feature 152b on the second side gear 150 and the contact feature 162b on the output hub have substantially the same Ob axis 154b. The output hub 160 also has a partial outer cylindrical surface 166 (whose axis is the O axis 164) which mates with the inner cylindrical surface 116 (concentric with the differential axis 170) on the smaller end housing 110a of the housing 110. The O axis 164 may shift a negligible distance away from the axis 170 during operation or reversal of driven rotation. Thus, the output hub 160 rotates substantially concentric with the differential axis 170, in synchronization (or at the same speed) with the second side gear 150, due to the mating of the contact features 152a, 162a, when driven in a first rotation direction, or the mating of the contact features 152b, 162b, when driven in the opposite rotation direction.

The first side gear 140 and the output hub 160 may be integral parts of the axle half shafts (not shown), or they may be attached to the half shafts by various known methods in the art, such as the spline 148 and 168, respectively, shown in FIGS. 1-3, as long as the first side gear 140 and its respective half shaft (not shown) are in a rotationally fixed manner such that they rotate at the same rotational speed, and the output hub 160 and its respective half shaft (not shown) are in a rotationally fixed manner such that they rotate at the same rotational speed.

In FIG. 1, the pinion gears 130 mesh with or engage the first side gear 140 and the second side gear 150 so that as the wheel speed differs between the two opposing wheels (not shown), the pinion gears rotate about a pinion axis 172, which is concentric with the shaft 132. Thus this differential assembly 100 serves one basic function of a differential, which is to differentiate speed between two wheels or two drive shafts.

Furthermore, the differential assembly 100 serves another basic function of a differential, which is to distribute torque to two wheels or two drive shafts. The differential assembly 100 receives an input torque from a power source, such as an engine/transmission (not shown), an electric motor (not shown), or a stored energy system (not shown), and transfers the torque to two half shafts (not shown). More specifically, the differential housing 110 rotates about the differential axis 170 by the input torque. The torque is transferred from the differential housing 110 to the output half shafts (not shown) by pinion gears 130, the first side gear 140, the second side gear 150, and the output hub 160.

A portion of the input torque is transferred by the pinion gears 130 directly to the first side gear 140 and then to its corresponding half shaft or wheel (not shown) through spline 148, similar to a side gear in an open differential.

The torque that is transferred to the second side gear 150 is substantially the same as the torque that is transferred to the first side gear 140 or the corresponding wheel. However, the final torque that is transferred to the output hub 160, its corresponding half shaft, or its respective wheel (not shown) may be different dependent upon the rotational speed difference of the two wheels.

When there is an input torque to the second side gear 150 from the pinion gears 130, and the input torque is clockwise in FIG. 2, a compressive force between the contact features 152a, 162a is generated, and the force direction is substantially normal to the plane formed by the O axis 164 and the Oa axis 154a. The contact features 152b, 162b are essentially disengaged, and there is no meaningful contact force between the contact features 152b, 162b. The input torque also causes equal reaction compressive forces between the partial outer cylindrical surface 156 and inner cylindrical surface 116 and between the partial outer cylindrical surface 166 and inner cylindrical surface 116. Hypothetically, if friction forces on the inner cylindrical surface 116 were zero, the torque input to the second side gear 150 would be equally transferred to the output hub 160 and then to its corresponding half shaft and its respective wheel. In reality, there are always certain friction forces on the inner cylindrical surface 116 due to the compressive forces between the partial outer cylindrical surface 156 and the inner cylindrical surface 116 and between the partial outer cylindrical surface 166 and the inner cylindrical surface 116, if there is any rotational speed difference between the differential housing 110 and the second side gear 150. The friction forces are proportional to the compressive force as well as the friction coefficient between the partial outer cylindrical surface 156 and the inner cylindrical surface 116 and between the partial outer cylindrical surface 166 and the inner cylindrical surface 116. The friction forces on the inner cylindrical surface 116 of the differential housing 110 also generate a frictional torque to the combined system of the second side gear 150 and the output hub 160.

If the wheel corresponding to the output hub 160 rotates faster than the wheel corresponding to the first side gear 140, such as when the former wheel corresponds to an outer wheel when the vehicle makes a turn, or the former wheel is on a road surface with very low friction, the differential housing 110 rotates slower than the second side gear 150 or the output hub 160. In this case, the frictional torque direction is opposite to that of the input torque and its direction is counterclockwise, and thus the torque output to the output hub 160 and then to its corresponding half shaft and its respective wheel is equal to the difference between the input torque to the second side gear 150 and the frictional torque. Thus in this case, the output torque to the wheel corresponding to the output hub 160 is smaller than the output torque to the wheel corresponding to the first side gear 140, by an amount equal to the frictional torque.

If the wheel corresponding to the output hub 160 rotates slower than the wheel corresponding to the first side gear 140, such as when the former wheel corresponds to an inner wheel, when the vehicle makes a turn, or the latter wheel is on a road surface with very low friction, the differential housing 110 rotates faster than the second side gear 150 or the output hub 160. In this case, the frictional torque direction is the same as that of the input torque and its direction is clockwise, and thus the torque output to the output hub 160 and then to its corresponding half shaft and its respective wheel is equal to the sum of the input torque to the second side gear 150 and the frictional torque. Thus in this case, the output torque to the wheel corresponding to the output hub 160 is larger than the output torque to the wheel corresponding to the first side gear 140, by an amount equal to the frictional torque.

When there is no substantial rotational speed difference between the two wheels, such as when the vehicle is traveling straight ahead without loss of traction, the pinion gears 130 revolve about the differential axis 170 but do not spin about their individual axes 172, and there is no substantial rotational speed difference between the differential housing 110 and the first side gear 140 and the second side gear 150. The frictional torque is static and lies approximately somewhere in between the available frictional torque in the above two cases (when the wheel corresponding to the output hub 160 rotates faster or slower than the wheel corresponding to the first side gear 140), depending on the actual road conditions and many other factors. In this case, the output torque to the wheel corresponding to the output hub 160 and the output torque to the wheel corresponding to the first side gear 140 have a difference in the amount of the static frictional torque. In any event, the actual frictional torque acts to prevent one or both wheels from slipping. In a symmetrical case, the static frictional torque is close to zero and the torque output to the output hub 160 and then to its corresponding half shaft and its respective wheel is equal to the input torque (from the pinion gears 130) to the second side gear 150. In this condition, the input torque to the differential assembly 100 is split substantially equally between the two wheels.

On the other hand, when the torque input to the second side gear 150 from the pinion gears 130 is counterclockwise in FIG. 2, a compressive force between contact features 152b, 162b is generated, and the force direction is substantially normal to the plane formed by the O axis 164 and the Ob axis 154b. The contact features 152a, 162a are essentially disengaged, and there is no meaningful contact force between the contact features 152a, 162a. The input torque also causes equal reaction compressive forces between the partial outer cylindrical surface 156 and the inner cylindrical surface 116 and between the partial outer cylindrical surface 166 and the inner cylindrical surface 116. Hypothetically, if friction forces on the inner cylindrical surface 116 were zero, the torque input to the second side gear 150 would be equally transferred to the output hub 160 and then to its corresponding half shaft and its respective wheel. In reality, there are always certain friction forces on the inner cylindrical surface 116 due to the compressive forces between the partial outer cylindrical surface 156 and the inner cylindrical surface 116 and between the partial outer cylindrical surface 166 and the inner cylindrical surface 116, if there is any rotational speed difference between the differential housing 110 and the second side gear 150. The friction forces are proportional to the compressive force as well as the friction coefficient between partial outer cylindrical surface 156 and inner cylindrical surface 116 and between partial outer cylindrical surface 166 and inner cylindrical surface 116. The friction forces on the inner cylindrical surface 116 of the differential housing 110 also generate a frictional torque to the combined system of the second side gear 150 and the output hub 160.

If the wheel corresponding to the output hub 160 rotates faster than the wheel corresponding to the first side gear 140, such as when the former wheel corresponds to an outer wheel when the vehicle makes a turn, or the former wheel is on a road surface with very low friction, the differential housing 110 rotates slower than the second side gear 150 or the output hub 160. In this case, the frictional torque direction is opposite to that of the input torque and its direction is clockwise, and thus the torque output to the output hub 160 and then to its corresponding half shaft and its respective wheel is equal to the difference between the input torque to the second side gear 150 and the frictional torque. Thus in this case, the output torque to the wheel corresponding to the output hub 160 is smaller than the output torque to the wheel corresponding to the first side gear 140, by an amount equal to the frictional torque.

If the wheel corresponding to the output hub 160 rotates slower than the wheel corresponding to the first side gear 140, such as when the former wheel corresponds to an inner wheel when the vehicle makes a turn, or the latter wheel is on a road surface with very low friction, the differential housing 110 rotates faster than the second side gear 150 or the output hub 160. In this case, the frictional torque direction is the same as that of the input torque and its direction is counterclockwise, and thus the torque output to the output hub 160 and then to its corresponding half shaft and its respective wheel is equal to the sum of the input torque to the second side gear 150 and the frictional torque. Thus in this case, the output torque to the wheel corresponding to the output hub 160 is larger than the output torque to the wheel corresponding to the first side gear 140, by an amount equal to the frictional torque.

When there is no substantial rotational speed difference between the two wheels, such as when the vehicle is traveling straight ahead without loss of traction, the pinion gears 130 revolve about the differential axis 170 but do not spin about their individual axes 172, and there is no substantial rotational speed difference between the differential housing 110 and the first side gear 140 and the second side gear 150. The frictional torque is static and lies approximately somewhere in between the available frictional torque in the above two cases (when the wheel corresponding to the output hub 160 rotates faster or slower than the wheel corresponding to the first side gear 140), depending on the actual road conditions and many other factors. In this case, the output torque to the wheel corresponding to the output hub 160 and the output torque to the wheel corresponding to the first side gear 140 have a difference in the amount of the static frictional torque. In any event, the actual frictional torque acts to prevent one or both wheels from slipping. In a symmetrical case, the static frictional torque is close to zero and the torque output to the output hub 160 and then to its corresponding half shaft and its respective wheel is equal to the input torque (from the pinion gears 130) to the second side gear 150. In this condition, the input torque to the differential assembly 100 is split substantially equally between the two wheels.

From the discussion above, it becomes clear that in providing the traction control, the differential assembly 100 provides more torque to the slower wheel or the non-slipping wheel, so that the non-slipping wheel can provide more torque to move the vehicle. The torque output difference between the slower wheel and the faster wheel is equal to the frictional torque as discussed above, which is the torque bias. This torque bias is proportional to the input torque to the differential assembly 100, and thus this embodiment shows a relatively constant torque bias ratio.

Referring to FIG. 2, the torque bias ratio generally increases with the friction coefficients between the partial outer cylindrical surface 156 and the inner cylindrical surface 116 and between the partial outer cylindrical surface 166 and the inner cylindrical surface 116. The torque bias ratio also increases with smaller distance between the O axis 164 and the Oa axis 154a, when the torque input to the second side gear 150 from the pinion gears 130 is clockwise, and increases with smaller distance between the O axis 164 and the Ob axis 154b, when the torque input to the second side gear 150 from the pinion gears 130 is counterclockwise. The torque bias or torque bias ratio of this differential assembly 100 is the torque bias or torque bias ratio of the second side gear 150/output hub 160 combination.

Many different configurations are possible for the second side gear 150 and the output hub 160. Especially, the contact features 152a, 152b on the second side gear 150 and the contact features 162a, 162b of the output hub 160 in FIG. 2 may be of different and varying shape sections, such as circular, parabolic, or elliptical sections, and they may be concave or convex in shape, sizes of these contact features (the diameter in the case of circular shape) may be different, and the location of the Oa axis 154a and the Ob axis 154b may vary. All of these variations may affect the torque bias ratio as discussed above. These variation examples are provided simply to identify the scope of the present invention, with the understanding that these examples are not limiting.

Even though in the illustrated embodiment the pinion gears 130 are a pair and are engaged around a central shaft 132, the pinion gears may vary in number and type (helical gears are feasible), and they may have their own individual rotating axis (parallel to the differential axis 170, or perpendicular to the differential axis 170, or forming another angle with respect to the differential axis 170). U.S. Pat. No. 3,706,239 shows a parallel axial pinion gear arrangement, and U.S. Pat. No. 2,859,641 shows a cross-axis helical pinion gear arrangement, for example. The pinion gears simply provide a means to transfer torque to the first side gear 140 and the second side gear 160. The specific way these pinion gears are configured does not change the spirit and scope of this invention.

Even though the inner cylindrical surface 116, on which both the second side gear 150 and the output hub 160 ride, are inside the small end housing 110a, an alternative cover end housing may be made to have an inner cylindrical surface 116 as part of its features. This still falls within the scope of the present invention, because the small end housing 110a and the cover end housing 110b are functionally rigidly fixed together to form the assembly housing 110.

The counterbalance holes 158 on the second side gear 150 are optional. They preferably serve to counterbalance the whole differential assembly 100 so that its center of gravity is by design on the differential assembly axis 170 to minimize vibration and noise especially at high vehicle speed. These counterbalance holes may have different forms and locations dependent upon the actual design.

Many other additions or modifications may be applied to this embodiment within the spirit of the present invention. For example, washers may be added in between the pinion gears 130 and housing 110. Since the pinion gears 130 apply separation forces to the first side gear 140 and the second side gear 150, the resulting axial thrust forces push the first side gear 140 and the second side gear 150 against the contacting surfaces of the housing 110. Washers or multiple disk clutch washers with varying frictional characteristics may also be added between the first side gear 140 and the corresponding contacting surface of the housing 110, or the second side gear 150 and the corresponding contacting surface of the housing 110, to enhance durability or further optimize the torque bias ratio.

The pinion gears 130, the first side gear 140, the second side gear 150, the output hub 160, and the shaft 132 are preferably, though not necessarily, formed, forged, or machined out of steel. The differential housing 110 is preferably, though not necessarily, made of cast iron or made of steel. Each or all these components may be modified with surface treatments, coatings, or linings, including, but not limited to, gas nitriding, carborizing, titanium nitride coating, or frictional brake material coating, which may enhance their durability or frictional characteristics.

When installed in a vehicle, a differential cover (not shown) may encase the whole differential assembly 100 to protect the differential assembly 100 from environmental contamination. As with most other differential assemblies, certain differential oil, and/or traction fluid, and/or frictional modifying additives may be used to elongate the life and/or enhance the performance of the differential assembly. Various known methods to circulate fluid to the inner cylindrical surface 116, the partial outer cylindrical surface 156, and the partial outer cylindrical surface 166 may include, but are not limited to, passages, helical grooves, and baffles to further elongate the life of the differential assembly.

As another example, seals such as o-ring or lip style seals may be employed between the surfaces experiencing relative motion during differentiation of the second side gear 150, the output hub 160, and the differential housing 110, in order to enclose these surfaces and prevent internal lubrication from escaping and to prevent the external environment from entering and interfering with these surfaces.

The differential components 150, 160 are relatively monolithic, and even if the differential assembly shown in the above embodiments experience severe conditions, such as loss of lubrication, which cause wear to the inner cylindrical surface 116, partial outer cylindrical surface 156, and partial outer cylindrical surface 166, the differential assembly continues to maintain its general intended function. Although there may be an increase of backlash and change to bias ratio due to the wear, no catastrophic failure is expected.

Figure 4:
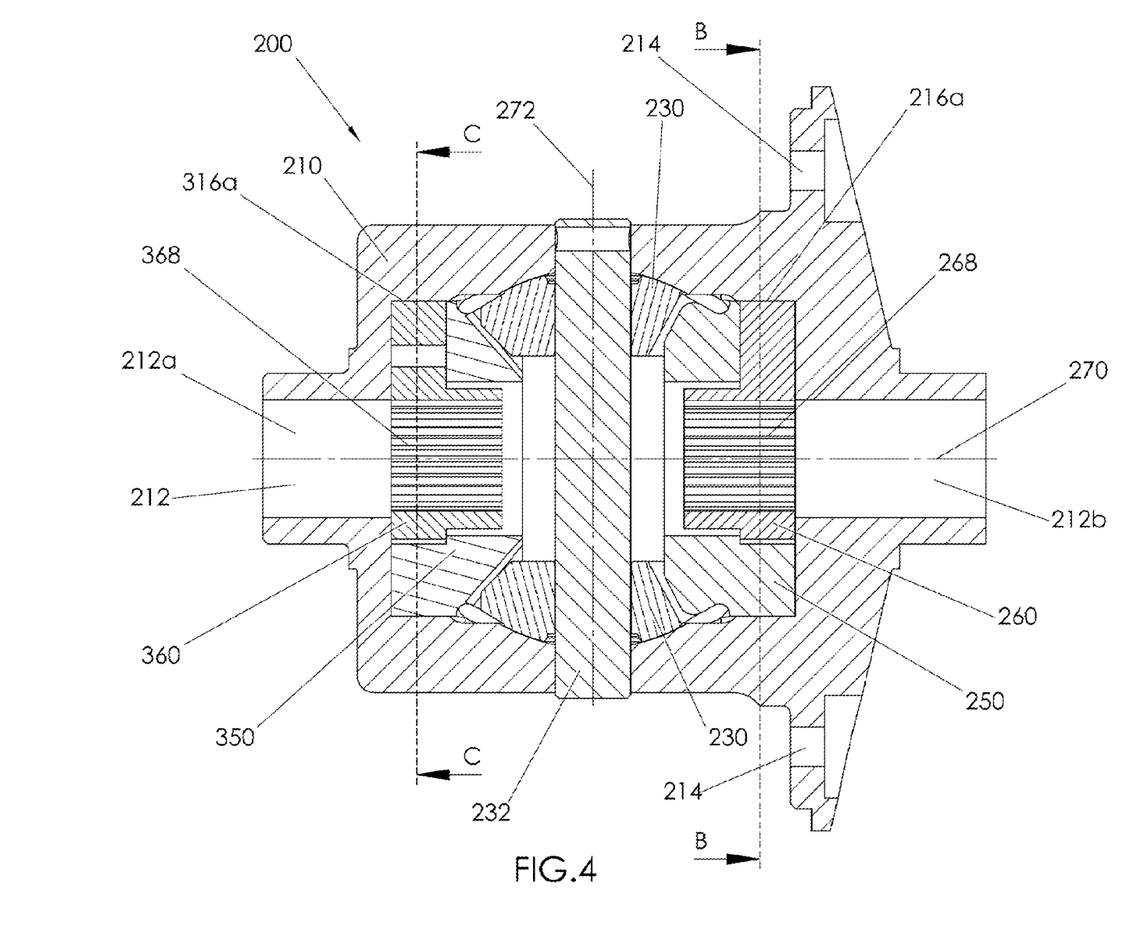
FIG. 4 is a cross-section view of a differential gear assembly in another embodiment of the present invention.
Figure 5:
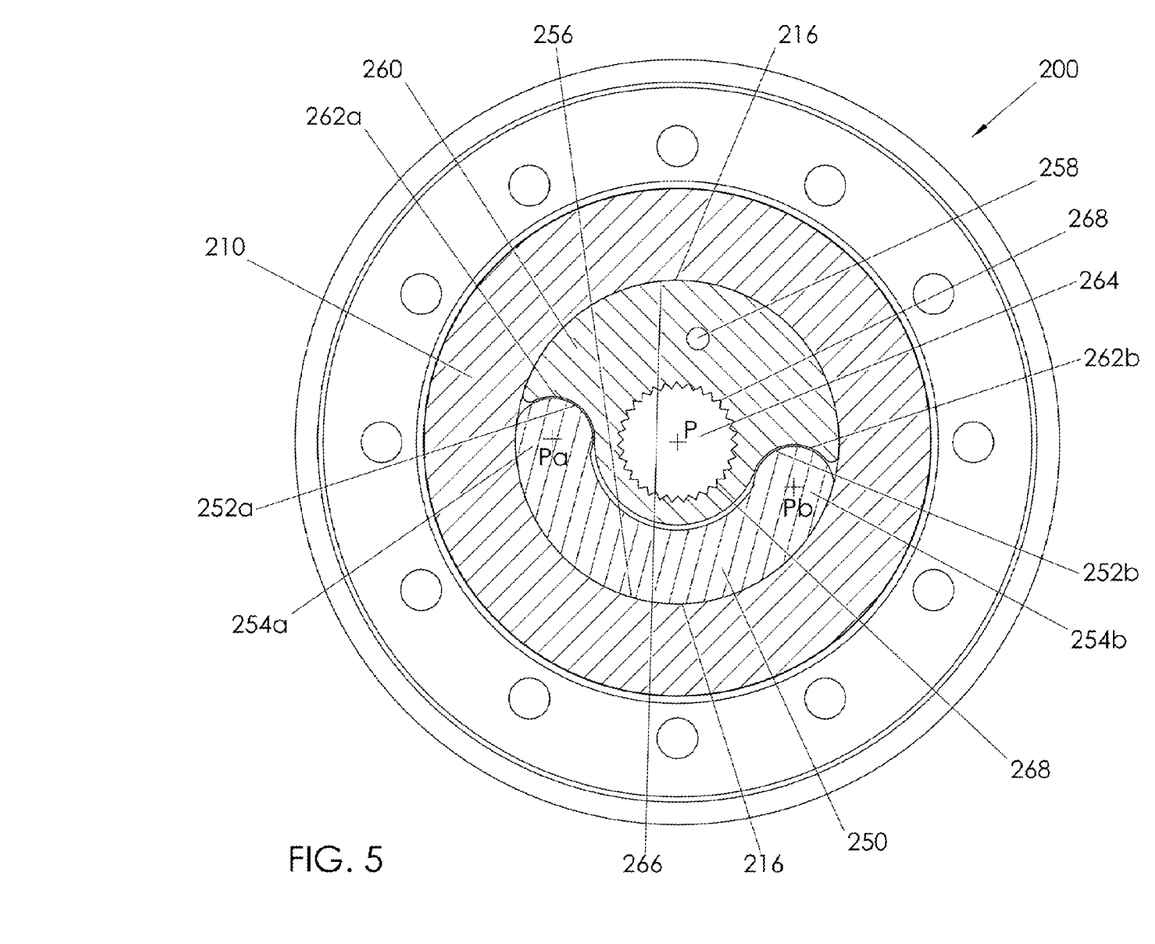
FIG. 5 is a cross-section view of the differential gear assembly of FIG. 4 taken along line B-B.
Figure 6:
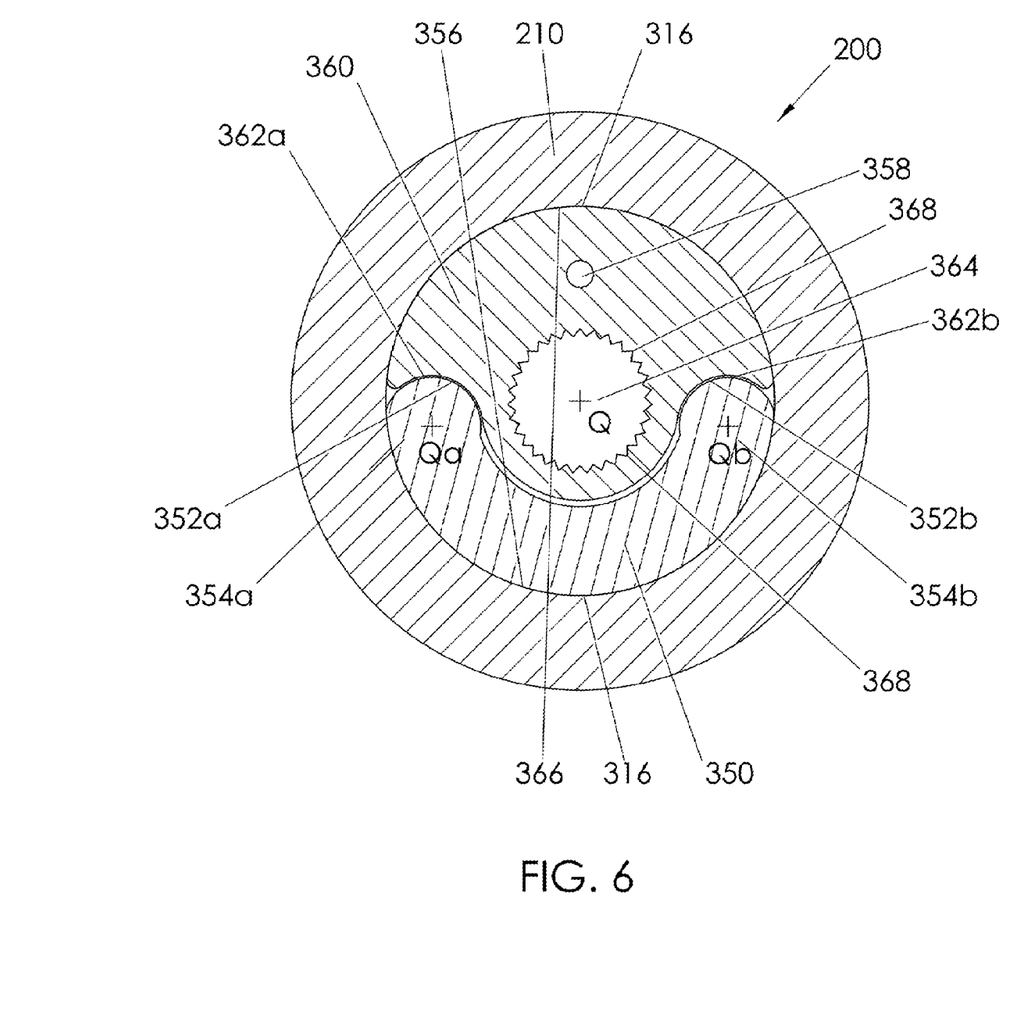
FIG. 6 is a cross-section view of the differential gear assembly of FIG. 4 taken along line C-C.
Figure 7:
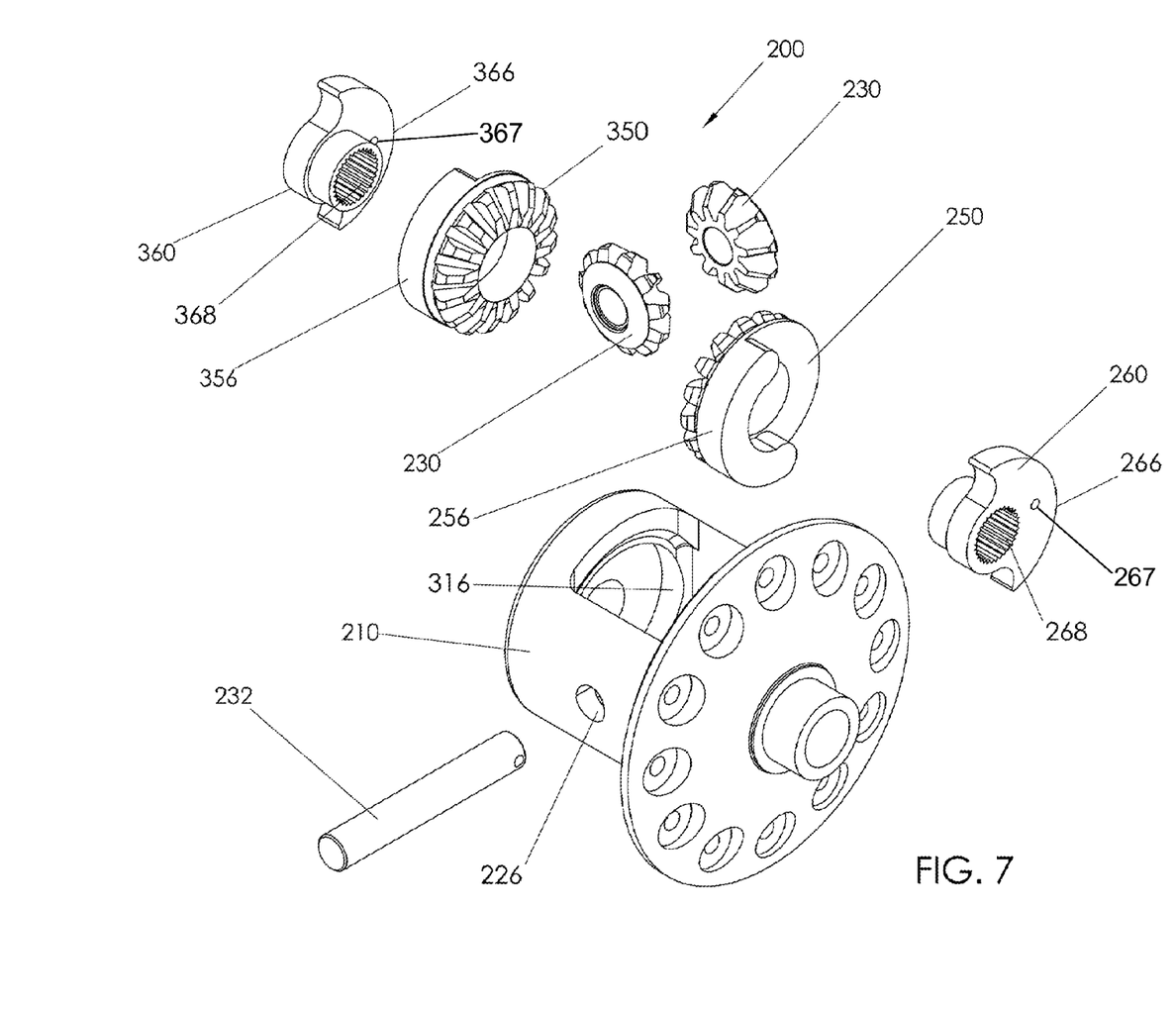
FIG. 7 is an exploded perspective view of the differential gear assembly of FIG. 4.

FIGS. 4-6 illustrate another embodiment of a differential assembly 200 for use in a vehicle. FIG. 7 illustrates the same differential assembly in a disassembled state. The vehicle may be a front wheel drive type, a rear wheel drive type, a four wheel drive type, or a multi-axle drive type. The differential assembly may be used in any or all of the vehicle's axles as well as between any or all axles, commonly referred to as "center box" applications. For simplicity, the following description describes the configuration and function of a differential assembly example used in a single axle driven application. However, the mechanism or the operation principle of the differential is similarly implied for each of the above stated applications.

The differential assembly 200 shown in FIGS. 4-7 includes a differential housing 210. The differential housing includes mounting holes 214 for receiving bolts (not shown). In FIG. 4, the differential housing 210 defines a common inner cylindrical channel 212, which includes the channel 212a and the channel 212b. Each channel 212a, 212b of the inner cylindrical channel 212 is shaped to receive a half shaft (not shown) to which a driven wheel of the vehicle is attached. The common axis defined by the channels 212a, 212b defines the differential axis 270. In addition, in FIGS. 4-6, the differential housing 210 is configured to house various members including a first side gear 350, a second side gear 250, a pair of pinion gears 230, a shaft 232, a first output hub 360, and a second output hub 260.

To some degree, the differential housing 210 is similar to most open differential cases. The differential housing 210 defines holes 226 (shown in FIG. 7) to receive and support the shaft 232 about which the pinion gears 230 rotate.

Referring to FIGS. 4, 6 and 7, the first side gear 350 has a partial outer cylindrical surface 356, which is maintained within the left side of the differential housing 210 by a cylindrical recess 316a (concentric with the differential axis 270), so that the first side gear 350 rotates about the differential axis 270. The cylindrical recess 316a has an inner cylindrical surface 316.

In FIG. 6, the first output hub 360 is maintained by both the first side gear 350 and the housing 210. The first side gear 350 has a contact feature 352a that mates with a contact feature 362a on the first output hub 360, when driven in a first rotation direction (clockwise in FIG. 6). The first side gear 350 has a contact feature 352b that mates with a contact feature 362b on the first output hub 360, when driven in the opposite rotation direction (counterclockwise in FIG. 6). These contact features 352a, 352b, 362a, 362b are shown as substantially cylindrical, but other shapes are possible for these contact features. The contact feature 352a on the first side gear 350 and the contact feature 362a on the first output hub 360 have substantially the same Qa axis 354a, while the contact feature 352b on the first side gear 350 and the contact feature 362b on the first output hub 360 have substantially the same Qb axis 354b. The first output hub 360 also has a partial outer cylindrical surface 366 (whose axis is substantially the Q axis 364), which mates with the inner cylindrical surface 316 (concentric with the differential axis 270) of the differential housing 210. The Q axis 364 may shift a negligible distance away from the differential axis 270 during operation or reversal of driven rotation. Thus the first output hub 360 rotates substantially concentric about the differential axis 270, in synchronization (or at the same speed) with the first side gear 350, due to the mating of the contact features 352a, 362a, when driven in the first rotation direction (clockwise in FIG. 6) or the mating of the contact features 352b, 362b, when driven in the opposite rotation direction (counterclockwise in FIG. 6).

Referring to FIGS. 4, 5, and 7, the second side gear 250 has a partial outer cylindrical surface 256, which is maintained within the right side of the differential housing 210 by a cylindrical recess 216a (concentric with the differential axis 270), so that the second side gear 250 rotates about the differential axis 270. The cylindrical recess 216a has an inner cylindrical surface 216.

In FIG. 5, the second output hub 260 is maintained by both the second side gear 250 and the differential housing 210. The second side gear 250 has a contact feature 252a that mates with a contact feature 262a on the second output hub 260, when driven in a first rotation direction (clockwise in FIG. 5). The second side gear 250 has a contact feature 252b that mates with a contact feature 262b on the second output hub 260, when driven in the opposite driven rotation direction (counterclockwise in FIG. 5). These contact features 252a, 252b, 262a, 262b are shown as substantially cylindrical, but other shapes are possible for these contact features. The contact feature 252a on the second side gear 250 and the contact feature 262a on the second output hub 260 have substantially the same Pa axis 254a, while the contact feature 252b on the second side gear 250 and the contact feature 262b on the second output hub 260 have substantially the same Pb axis 254b. The second output hub 260 also has a partial outer cylindrical surface 266 (whose axis is the P axis 264) which mates with the inner cylindrical surface 216 (concentric with the differential axis 270) of the differential housing 210. The P axis 264 may shift a negligible distance away from the axis 270 during operation or reversal of driven rotation. Thus, the second output hub 260 rotates substantially concentric about the differential axis 270, in synchronization (or at the same speed) with the second side gear 250, due to the mating of the contact features 252a, 262a, when driven in the first rotation direction (clockwise in FIG. 5) or the mating of the contact features 252b, 262b, when driven in the opposite rotation direction (counterclockwise in FIG. 5).

The first output hub 360 and the second output hub 260 may be integral parts of the axle half shafts (not shown) or they may be attached to the half shafts by various known methods in the art, such as the spline 368 and 268, respectively, shown in FIGS. 4-7, as long as the first output hub 360 and its respective half shaft (not shown) are in a rotationally fixed manner, such that they rotate at the same rotational speed, and the second output hub 260 and its respective half shaft (not shown) are in a rotationally fixed manner such that they rotate at the same rotational speed.

In FIG. 4, the pinion gears 230 mesh with or engage the first side gear 350 and the second side gear 250, so that as the wheel speed differs between the two opposing wheels (not shown), the pinion gears 230 rotate about a pinion axis 272, which is concentric with the shaft 232. Thus this differential assembly 200 serves one basic function of differential, which is to differentiate speed between two wheels or two drive shafts.

Referring to FIGS. 4-7, compared to an open differential, two side gears (of an open differential) are modified and two output hubs are added. Compared to the first embodiment 100, the first side gear 140 is modified and it is replaced by a modified first side gear 350 and first output hub 360. The operation principle of the side gear 150/output hub 160 combination of the first embodiment 100 can be similarly applied to the first side gear 350 the first output hub 360 combination and the second side gear 250 the second output hub 260 combination of the second embodiment 200. When there is an input torque to the differential assembly 200, the torque bias is the result of frictional forces between each partial outer cylindrical surface 366, 266 of each output hub 360, 260 and each inner cylindrical surface 316, 216 of the differential housing 210 and between each partial outer cylindrical surface 356, 256 of each side gear 350, 250 and each inner cylindrical surface 316, 216 of the differential housing 210. When the input torque is clockwise in FIGS. 5 and 6, these frictional forces are caused by the torque generated compressive forces between each contact feature 362a, 262a of the output hub 360, 260 and the each contact feature 352a, 252a of the side gear 350, 250. When the input torque is counterclockwise in FIGS. 5 and 6, these frictional forces are caused by the torque generated compressive forces between each contact feature 362b, 262b of the output hub 360, 260 and each contact feature 352b, 252b of the side gear 350, 250. The torque bias of this differential assembly 200 is approximately the sum of the torque bias of the two side gear/output hub 350/360, 250/260 combinations. The torque bias ratio of this differential assembly 200 is approximately the product of the torque bias ratio of the two side gear/output hub 350/360, 250/260 combinations.

The counterbalance holes 258/358 on the side gears 250/350 and the counterbalance holes 267/367 on the output hubs 260/360 are optional. They preferably serve to counterbalance the whole differential assembly 200 so that its center of gravity is by design on the differential assembly axis 270 to minimize vibration and noise especially at high vehicle speed. These counterbalance holes may have different forms and locations dependent upon the actual design.

The features, modifications, and additions that are discussed for the first embodiment 100 may be similarly applied to the second embodiment 200.

It should be specifically noted that a preferred benefit is lower cost to manufacture due to a much lower part count compared to conventional limited slip differentials with a fixed torque bias ratio.

Another preferred benefit is the ease to retrofit the differential assembly into a current open differential model without significant design changes. In particular, the option to have axle retainers such as "C" clips is thoroughly maintained, so there is no need to change either axial shaft designs.

A further preferred benefit is an improved durability due to the use of a strong monolithic part but no fragile planetary gears. Furthermore, the reduced Hertzian contact stress between the partial outer cylindrical surfaces of the output hub or the side gear and the inner cylindrical surface of the differential housing potentially may increase the life of the differential assembly. It should be noted that planet gears employed in most other limited slip differentials with fixed bias ratio have convex surface-convex surface contact, thus causing very large Hertzian contact stresses.

Still another preferred benefit is that the different torque bias ratio of the differential assembly may be finely tuned and customized by changing certain design parameters as already discussed.

Having thus shown and described the basic concept of the invention, the foregoing detailed disclosure is intended to be presented by way of example only, and it is not limiting. Various alterations, improvements, and modifications will occur and are intended to those skilled in the art, though not explicitly stated herein. Any and all these alterations, improvements, and modifications are intended to be suggested hereby, and are within the true spirit and fair scope of the invention. Accordingly, the invention is limited only by the following claims and equivalents thereto.

All of the patent and non-patent references discussed herein are hereby incorporated by reference herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A differential assembly comprising:
a differential housing having a first rotation axis and having a first inner cylindrical surface substantially centered on the first rotation axis;
a first side gear having a first side gear outer cylindrical surface mating with the first inner cylindrical surface of the differential housing and having a first eccentric first side gear contact surface and a second eccentric first side gear contact surface;
a first output hub having a first output hub outer cylindrical surface mating with the first inner cylindrical surface of the differential housing, having a first eccentric first output hub contact surface mating with the first eccentric first side gear contact surface of the first side gear, and having a second eccentric first output hub contact surface mating with the second eccentric first side gear contact surface of the first side gear;
a second side gear rotatable substantially on the first rotation axis; and
at least one pinion gear assembly engaging the first side gear and the second side gear, the at least one pinion gear assembly comprising at least one pinion gear;
wherein the first eccentric first side gear contact surface, the second eccentric first side gear contact surface, the first eccentric first output hub contact surface, and the second eccentric first output hub contact surface are formed such that:
a first input torque on the first side gear in a clockwise direction causes compression forces between the first eccentric first output hub contact surface and the first eccentric first side gear contact surface, between the first side gear outer cylindrical surface of the first side gear and the first inner cylindrical surface of the differential housing, and between the first output hub outer cylindrical surface of the first output hub and the first inner cylindrical surface of the differential housing; and
a second input torque on the first side gear in a counterclockwise direction causes compression forces between the second eccentric first output hub contact surface and the second eccentric first side gear contact surface, between the first side gear outer cylindrical surface of the first side gear and the first inner cylindrical surface of the differential housing, and between the first output hub outer cylindrical surface of the first output hub and the first inner cylindrical surface of the differential housing.

2. The differential assembly of claim 1, wherein the differential housing has a second inner cylindrical surface substantially centered on the first rotation axis and the second side gear has a second side gear outer cylindrical surface mating with the second inner cylindrical surface of the differential housing.

3. The differential assembly of claim 2, wherein the second side gear has a first eccentric second side gear contact surface and a second eccentric second side gear contact surface, the differential assembly further comprising:
a second output hub having a second output hub outer cylindrical surface mating with the second inner cylindrical surface of the differential housing, having a first eccentric second output hub contact surface mating with the first eccentric second side gear contact surface of the second side gear, and having a second eccentric second output hub contact surface mating with the second eccentric second side gear contact surface of the second side gear;
wherein the first eccentric second side gear contact surface, the second eccentric second side gear contact surface, the first eccentric second output hub contact surface, and the second eccentric second output hub contact surface are formed such that:
a third input torque on the second side gear in a clockwise direction causes compression forces between the first eccentric second output hub contact surface and the first eccentric second side gear contact surface, between the second side gear outer cylindrical surface of the second side gear and the second inner cylindrical surface of the differential housing, and between the second output hub outer cylindrical surface of the second output hub and the second inner cylindrical surface of the differential housing; and a fourth input torque on the second side gear in a counterclockwise direction causes compression forces between the second eccentric second output hub contact surface and the second eccentric second side gear contact surface, between the second side gear outer cylindrical surface of the second side gear and the second inner cylindrical surface of the differential housing, and between the second output hub outer cylindrical surface of the second output hub and the second inner cylindrical surface of the differential housing.

4. The differential assembly of claim 3, wherein the first eccentric second side gear contact surface, the second eccentric second side gear contact surface, the first eccentric second output hub contact surface, and the second eccentric second output hub contact surface are substantially cylindrical in shape.

5. The differential assembly of claim 3, wherein at least one of the first side gear, the second side gear, the first output gear, and the second output gear has at least one counterbalance hole to counterbalance the differential assembly.

6. The differential assembly of claim 3, wherein the compression forces between the second side gear outer cylindrical surface of the second side gear and the second inner cylindrical surface of the differential housing and between the second output hub outer cylindrical surface of the second output hub and the second inner cylindrical surface of the differential housing cause frictional forces between the differential housing and the second side gear and between the differential housing and the second output hub to provide a torque bias to the differential assembly.

7. The differential assembly of claim 3, wherein the at least one pinion gear assembly comprises:
a first pinion gear rotatable around a pinion axis and engaging the first side gear and the second side gear; and
a second pinion gear rotatable around the pinion axis and engaging the first side gear and the second side gear.

8. The differential assembly of claim 3 further comprising:
a first shaft coupled to rotate with the first output hub; and
a second shaft coupled to rotate with the second output hub.

9. The differential assembly of claim 1, wherein the first eccentric first side gear contact surface, the second eccentric first side gear contact surface, the first eccentric first output hub contact surface, and the second eccentric first output hub contact surface are substantially cylindrical in shape.

10. The differential assembly of claim 1, wherein the first side gear has at least one counterbalance hole to counterbalance the differential assembly.

11. The differential assembly of claim 1, wherein the first output hub has at least one counterbalance hole to counterbalance the differential assembly.

12. The differential assembly of claim 1, wherein the first side gear has at least one first counterbalance hole and the first output hub has at least one second counterbalance hole to counterbalance the differential assembly.

13. The differential assembly of claim 1, wherein the compression forces between the first side gear outer cylindrical surface of the first side gear and the first inner cylindrical surface of the differential housing and between the first output hub outer cylindrical surface of the first output hub and the first inner cylindrical surface of the differential housing cause frictional forces between the differential housing and the first side gear and between the differential housing and the first output hub to provide a torque bias to the differential assembly.

14. The differential assembly of claim 1, wherein the at least one pinion gear assembly comprises:
a first pinion gear rotatable around a pinion axis and engaging the first side gear and the second side gear; and
a second pinion gear rotatable around the pinion axis and engaging the first side gear and the second side gear.

15. The differential assembly of claim 1 further comprising:
a first shaft coupled to rotate with the first output hub; and
a second shaft coupled to rotate with the second side gear.

16. A method of differentiating torque between a first shaft and a second shaft in a differential assembly comprising:
a differential housing having a first rotation axis and having a first inner cylindrical surface substantially centered on the first rotation axis;
a first side gear having a first side gear outer cylindrical surface mating with the first inner cylindrical surface of the differential housing and having a first eccentric first side gear contact surface and a second eccentric first side gear contact surface;
a first output hub having a first output hub outer cylindrical surface mating with the first inner cylindrical surface of the differential housing, having a first eccentric first output hub contact surface mating with the first eccentric first side gear contact surface of the first side gear, and having a second eccentric first output hub contact surface mating with the second eccentric first side gear contact surface of the first side gear;
a second side gear rotatable substantially on the first rotation axis; and
at least one pinion gear assembly engaging the first side gear and the second side gear, the at least one pinion gear assembly comprising at least one pinion gear, the method comprising the step of:
applying compression forces to the first inner cylindrical surface of the differential housing by contact with the first side gear outer cylindrical surface of the first side gear and the first output hub outer cylindrical surface of the first output hub based on an input torque applied to the first side gear causing compression forces between the first eccentric first side gear contact surface of the first side gear and the eccentric first output hub contact surface of the first output hub, thereby providing a torque bias between the first side gear and the second side gear.

* * * * *